No. 878,950. PATENTED FEB. 11, 1908.
G. M. HARRISON.
BELT FASTENER.
APPLICATION FILED APR. 8, 1907.
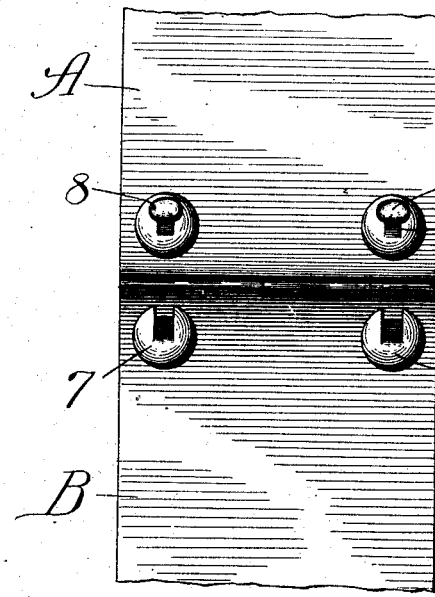
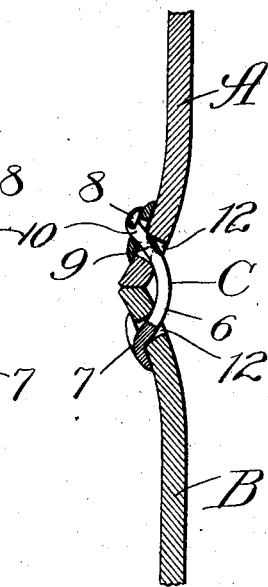
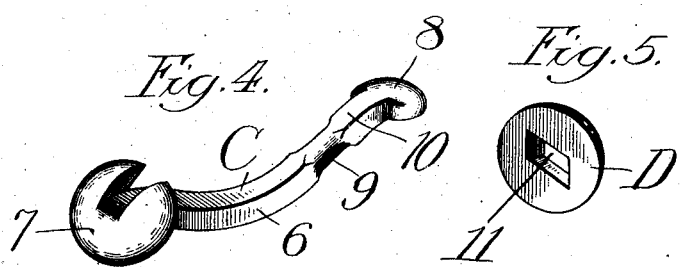
Witnesses:
Inventor:
George M. Harrison,
By L. B. Coupland,
Atty.

UNITED STATES PATENT OFFICE.

GEORGE MORTIMER HARRISON, OF LAKE BLUFF, ILLINOIS.

BELT-FASTENER.

No. 878,950.  Specification of Letters Patent.  Patented Feb. 11, 1908.

Application filed April 8, 1907. Serial No. 367,026.

*To all whom it may concern:*

Be it known that I, GEORGE M. HARRISON, citizen of the United States, residing at Lake Bluff, in the county of Lake and State of Illinois, have invented certain new and useful Improvements in Belt-Fasteners, of which the following is a specification.

This invention relates to belt-fasteners for coupling together the joining ends of belts used in the transmission of power; and has for its object to provide a device of this character, that is very efficient for the purpose intended and which may be inserted and removed with facility.

Another object is to provide a fastener of such a form as to not have a straight pull or strain in the line of draft, but rather diagonally thereto, so as to lessen the wear on the punch holes and avoid tearing out.

In the drawing, Figure 1 is an edge view of the joined ends of a belt. Fig. 2 is a plan of the same. Fig. 3 is a longitudinal section. Fig. 4 is a perspective view of one of the fasteners; and Fig. 5 is a similar view of a loose locking cap.

A and B represent the respective joining ends of a belt; C the fastener, and D a separable locking cap or washer. The fastener C consists of a bar or shank 6 having a large flanged head 7 formed on one end thereof, and a smaller head 8 on the other end and all forming an integral structure. The bar 6 is bow-shaped and approximately square in cross-section, except a small portion 9 which is round, as best shown in Fig. 4. The square part 10 extends between the round portion 9 and the small head end 8.

The loose locking cap D is provided with a slot opening 11 therethrough and which, when placed transversely will permit of the cap D slipping over the head end 8 which is slightly elongated transversely. The locking cap is of a diameter corresponding to that of the fixed flanged head 7. The holes 12 in the belt are round and are made with the ordinary round belt punch, and are much less liable to tear out than when the belt is provided with slit openings for the insertion of fastening devices.

In securing the ends of the belt together the small head end 8 of the fastener is first inserted through one end of the belt from the outer side, then across through the joining end from the inside to the outside. The loose locking cap is then held to bring the slot therein transversely to the running line of the belt and slipped on over the head end 8 down to the rounded part 9 and the cap turned to bring the slot 11 into a position lengthwise with that of the belt, then slipped back over the square part 10 against the head 7 and is loosely retained in place and locks the fastener against accidental disengagement.

It will be noted that the bowed convex side of the fastener stands away from the surface of the belt so that the ends of the bar 6 in the holes 12 extend at an oblique angle with reference to the line of the belt and throws the strain on the fastener onto the surface of the belt instead of altogether on the holes, thus lessening the liability of tearing out the ends and greatly increasing the durability and life of the belt.

It will be understood that the round head 7 being of a larger area than the holes 12, comes to bearing on the surface of the belt, and the bar part being at the angle shown, the belt-holes are relieved from any undue strain. The loose cap on the other end of the fastener is simply a duplicate of the head 7 in practical working and covers quite an area of the belt surface.

When there is no strain on the belt the ends may be folded inwardly and the fasteners inserted or removed with all possible facility.

Having thus described my invention, what I claim is—

A belt fastener comprising a bar having a belt-engaging head formed on one end and a laterally-elongated head on the other end, the body of said bar being substantially square in cross section for a short distance inward from the laterally-elongated head and then round in cross-section, and a separable locking cap provided with a slotted opening proportioned to slip over the laterally-elongated head and the square portion of the bar to the round portion thereof, there permitting the cap to be rotated a quarter turn and slipped back on the square portion, where it is held against rotation and against removal over the laterally-elongated head.

In testimony whereof I affix my signature, in presence of two witnesses.

GEORGE MORTIMER HARRISON.

Witnesses:
 L. B. COUPLAND,
 G. E. CHURCH.